(12) United States Patent
Umebayashi et al.

(10) Patent No.: US 8,424,462 B2
(45) Date of Patent: Apr. 23, 2013

(54) RAILCAR BODYSHELL AND METHOD FOR MANUFACTURING THE SAME

(75) Inventors: Tomonori Umebayashi, Kobe (JP); Fumihide Inamura, Kakogawa (JP); Hiroshi Sugiura, Kobe (JP)

(73) Assignee: Kawasaki Jukogyo Kabushiki Kaisha, Kobe-Shi (JP)

( * ) Notice: Subject to any disclaimer, the term of this patent is extended or adjusted under 35 U.S.C. 154(b) by 0 days.

(21) Appl. No.: 13/257,653

(22) PCT Filed: Mar. 30, 2010

(86) PCT No.: PCT/JP2010/002295
§ 371 (c)(1),
(2), (4) Date: Nov. 3, 2011

(87) PCT Pub. No.: WO2010/116677
PCT Pub. Date: Oct. 14, 2010

(65) Prior Publication Data
US 2012/0042805 A1 Feb. 23, 2012

(30) Foreign Application Priority Data
Mar. 30, 2009 (JP) .................. 2009-081402

(51) Int. Cl.
*B61D 25/00* (2006.01)
(52) U.S. Cl.
USPC ................ 105/396; 105/397; 105/404
(58) Field of Classification Search ............ 105/396, 105/397, 400, 404, 409
See application file for complete search history.

(56) References Cited

U.S. PATENT DOCUMENTS

| | | | | |
|---|---|---|---|---|
| 5,042,395 A | * | 8/1991 | Wackerle et al. | 105/397 |
| 5,333,554 A | * | 8/1994 | Yamada et al. | 105/397 |
| 5,433,151 A | * | 7/1995 | Ohara et al. | 105/397 |
| 5,669,999 A | * | 9/1997 | Anderegg et al. | 156/173 |
| 5,685,229 A | * | 11/1997 | Ohara et al. | 105/397 |
| 5,890,435 A | * | 4/1999 | Thoman et al. | 105/404 |
| 6,196,136 B1 | * | 3/2001 | Yoshizaki et al. | 105/396 |

(Continued)

FOREIGN PATENT DOCUMENTS

| JP | U-58-073068 | 5/1983 |
|---|---|---|
| JP | A-58-185360 | 10/1983 |

(Continued)

OTHER PUBLICATIONS

International Search Report dated Jun. 29, 2010 in International Application No. PCT/JP2010/002295.

*Primary Examiner* — Jason C Smith
(74) *Attorney, Agent, or Firm* — Oliff & Berridge, PLC

(57) ABSTRACT

To adequately maintain recyclability of a railcar bodyshell while improving the appearance, manufacturing accuracy, and producibility of the railcar bodyshell. A railcar bodyshell includes: a metal side outside plate 2 having openings 2b to 2d; a plurality of metal horizontal frame members 3 joined to an inner surface of the side outside plate 2 and extending in a railcar front-rear direction; a plurality of metal vertical frame members 4 joined to the inner surface of the side outside plate 2 and extending in a railcar upper-lower direction; and carbon fiber reinforced resin members 5A to 5D each joined to a predetermined portion on the inner surface of the side outside plate 2, the predetermined portion including a corner portion of each of peripheral portions 2f to 2h respectively defining openings 2b to 2d or a part of a portion between the vertical frame members 4.

9 Claims, 13 Drawing Sheets

U.S. PATENT DOCUMENTS

| | | | |
|---|---|---|---|
| 6,554,348 B1* | 4/2003 | Gernstein | 296/178 |
| 6,866,329 B2* | 3/2005 | Clifford | 296/181.1 |
| 7,958,831 B2* | 6/2011 | Campus | 105/396 |
| 2007/0214998 A1* | 9/2007 | Komaki et al. | 105/396 |
| 2007/0295240 A1* | 12/2007 | Campus | 105/396 |
| 2008/0011188 A1* | 1/2008 | Campus | 105/401 |
| 2012/0042805 A1* | 2/2012 | Umebayashi et al. | 105/396 |
| 2012/0067247 A1* | 3/2012 | Umebayashi et al. | 105/396 |

FOREIGN PATENT DOCUMENTS

| | | |
|---|---|---|
| JP | U-61-043575 | 3/1986 |
| JP | A-5-213189 | 8/1993 |
| JP | A-6-263029 | 9/1994 |
| JP | A-7-81556 | 3/1995 |
| JP | B2-3219278 | 10/2001 |
| JP | A-2003-112622 | 4/2003 |
| JP | A-2003-314085 | 11/2003 |
| JP | A-2005-076230 | 3/2005 |
| JP | A-2006-27366 | 2/2006 |
| JP | A-2007-112344 | 5/2007 |
| JP | A-2007-137263 | 6/2007 |
| JP | A-2008-126758 | 6/2008 |
| JP | A-2009-024466 | 2/2009 |
| WO | WO 2007/054671 A1 | 5/2007 |

* cited by examiner (a)

(b)

(c)

(a)

(b)

RAILCAR BODYSHELL AND METHOD FOR MANUFACTURING THE SAME

TECHNICAL FIELD

The present invention relates to a railcar bodyshell including a side bodyshell having side outside plates and frame members and a method for manufacturing the railcar bodyshell.

BACKGROUND ART

Railcar bodyshells manufactured by using stainless steel have been conventionally known. The bodyshells manufactured by using stainless steel have many advantages. For example, since the bodyshells manufactured by using stainless steel do not corrode, paint is unnecessary, and maintenance is easy. FIG. 13(a) is a front view of a side bodyshell of a conventional railcar when viewed from a car interior side, and FIG. 13(b) is a cross-sectional view taken along line XIIIb-XIIIb of FIG. 13(a). As shown in FIGS. 13(a) and 13(b), a side bodyshell 101 includes: a side outside plate 102; vertical frame members 103 located at a door pocket portion and welded to an inner surface of the side outside plate 102; and horizontal frame members 104 located under a window opening and welded to the inner surface of the side outside plate 102. Each of PTLs 1 and 2 proposes a railcar bodyshell in which the frame members are laser welded to the outside plate. In accordance with this, weld marks on an outer finished surface of the outside plate become less visible, so that the appearance of the railcar bodyshell can be improved.

FIG. 14 is a perspective view showing a bodyshell configured such that respective members of a conventional railcar are laser welded to one another. FIG. 15 is a front view of the side bodyshell of FIG. 14 when viewed from the car interior side. FIG. 16(a) is a major portion enlarged view showing the vicinity of the window opening of the side bodyshell of FIG. 15. FIG. 16(b) is a cross-sectional view taken along line XVIb-XVIb of FIG. 16(a). As shown in FIG. 14, a bodyshell 111 includes: a roof bodyshell 112, side bodyshells 113, end bodyshells (not shown), and an underframe 114. As shown in FIGS. 15 and 16, the side bodyshell 113 is formed such that: horizontal frame members 118 are laser welded to a side outside plate 117 from the car interior side, the side outside plate 117 having a window opening 117a; and vertical frame members 119 are laser welded to the horizontal frame members 118 from the car interior side.

Since high stress is generated at corner portions of a peripheral portion defining the window opening 117a, reinforcing plates 115 are respectively provided at the corner portions. Each of the reinforcing plates 115 has a substantially L shape corresponding to the corner portion and is spot welded to the side outside plate 117. Here, the reason why the reinforcing plate 115 is spot welded is because due to structural restrictions of a laser welder, the reinforcing plate 115 cannot be laser welded to a reinforced portion. For example, in an example shown in FIG. 16, the reinforcing plate 115 is spot welded to the side outside plate 117 by ten spots.

Citation List
Patent Literature
PTL 1: Japanese Laid-Open Patent Application Publication No. 2007-112344
PTL 2: Japanese Laid-Open Patent Application Publication No. 2007-137263
PTL 3: Japanese Laid-Open Patent Application Publication No. 5-213189
PTL 4: Japanese Laid-Open Patent Application Publication No. 6-263029
PTL 5: Japanese Laid-Open Patent Application Publication No. 7-81556
PTL 6: Japanese Patent No. 3219278

SUMMARY OF INVENTION

Technical Problem

However, in accordance with the method for laser welding a window frame 116 to the peripheral portion of the window opening 117a of the side outside plate 117 and then spot welding the reinforcing plates 115 for reinforcing the corner portions, the weld marks of the spot welding remain. To be specific, although the appearance of the railcar bodyshell can be improved by manufacturing the railcar bodyshell using the laser welding, one problem is that the appearance deteriorates by attaching the reinforcing plates. Another problem is that influences of thermal distortion by the spot welding cause a dimensional error of the bodyshell, and this deteriorates manufacturing accuracy. Yet another problem is as follows: a laser weld bead, which is a continuous undulation of base materials melted by laser irradiation, is generated on the bodyshell by the laser welding; since the reinforcing plate 115 is welded on the car interior side, the laser weld bead of the side outside plate 117 and the window frame 116 needs to be removed by a grinder; and this increases process steps.

Each of PTLs 3 to 6 proposes a technique to use a carbon fiber reinforced resin for the outside plate and frame member of the railcar. In accordance with this, the railcar bodyshell can be significantly reduced in weight and can be assembled with high efficiency. However, in accordance with the techniques described in PTLs 3 to 6, since major portions of the railcar bodyshell are formed by the carbon fiber reinforced resin, a use ratio of the carbon fiber reinforced resin in the bodyshell is high. Unlike metals, it is difficult to recycle the carbon fiber reinforced resin. Therefore, the problem is that recyclability deteriorates in a case where the major portions of the bodyshell are formed by the carbon fiber reinforced resin. On this account, in consideration of the recyclability, the metals, such as stainless steel, are currently used to form the bodyshell.

Here, an object of the present invention is to adequately maintain the recyclability of the railcar bodyshell while improving the appearance, manufacturing accuracy, and producibility of the railcar bodyshell.

Solution to Problem

A railcar bodyshell of the present invention includes: a metal side outside plate having an opening; a plurality of metal frame members joined to an inner surface of the side outside plate and extending in a railcar upper-lower direction or a railcar front-rear direction; and a fiber reinforced resin member joined to a predetermined portion on an inner surface side of the side outside plate, the predetermined portion including a corner portion of a peripheral portion defining the opening or including a part of a portion between the frame members.

In accordance with the above configuration, the fiber reinforced resin member is joined to the predetermined portion including the corner portion of the peripheral portion defining the opening or a part of the portion between the frame members. Therefore, the weld marks for the reinforcement of the predetermined portion do not remain, the dimensional error due to the thermal distortion does not occur, and the process is easy. Therefore, the appearance, manufacturing accuracy, and producibility improve. In addition, the portion where the fiber reinforced resin member is provided is only the predetermined portion including the corner portion of the peripheral portion defining the opening or a part of the portion between the frame members, and the major portions, that is, the side outside plate and the frame members joined to the side outside plate are made of metal. Therefore, the recyclability can be adequately maintained. Further, by providing the fiber reinforced resin member at the predetermined portion including the corner portion of the peripheral portion defining the opening or a part of the portion between the frame members, the number of metal frame members can be reduced, and the weight of the carbody and the number of manufacturing man-hours can also be reduced. As above, both improving the appearance, manufacturing accuracy, and producibility of the railcar bodyshell and adequately maintaining the recyclability of the railcar bodyshell can be preferably achieved.

Moreover, a method for manufacturing a railcar bodyshell of the present invention includes the steps of: joining a plurality of metal frame members to an inner surface of a metal side outside plate having an opening, the frame members extending in a railcar upper-lower direction or a railcar front-rear direction; and forming a fiber reinforced resin member by adhering a fiber sheet to a predetermined portion on an inner surface side of the side outside plate by an impregnated adhesive resin, the predetermined portion including a corner portion of a peripheral portion defining the opening or including a part of a portion between the frame members.

In accordance with the above method, as with the above, both improving the appearance, manufacturing accuracy, and producibility of the railcar bodyshell and adequately maintaining the recyclability of the railcar bodyshell can be preferably achieved. In addition, since the fiber sheet has flexibility, the fiber sheet is spread along the predetermined portion to be impregnated with and adhered by the impregnated adhesive resin. With this, the fiber reinforced resin member adhered to the predetermined portion can be easily formed, and the side bodyshell can be reinforced by a simple process. Here, the "fiber sheet" is a sheet which is formed such that fibers, such as carbon fibers, utilized in a fiber reinforced resin are formed in a cloth shape and which is not impregnated with a resin.

Advantageous Effects of Invention

In accordance with the present invention, both improving the appearance, manufacturing accuracy, and producibility of the railcar bodyshell and adequately maintaining the recyclability of the railcar bodyshell can be preferably realized.

BRIEF DESCRIPTION OF DRAWINGS

FIG. 8(a) shows an unloaded state. FIG. 8(b) shows a state in which the bodyshell bends since passengers get therein, and the bending is maximum at the center of the bodyshell in a railcar front-rear direction. FIG. 8(c) shows deformation of a window opening 2b of a side outside plate 2.

DESCRIPTION OF EMBODIMENTS

Hereinafter, an embodiment according to the present invention will be explained in reference to the drawings.

Figure 1:
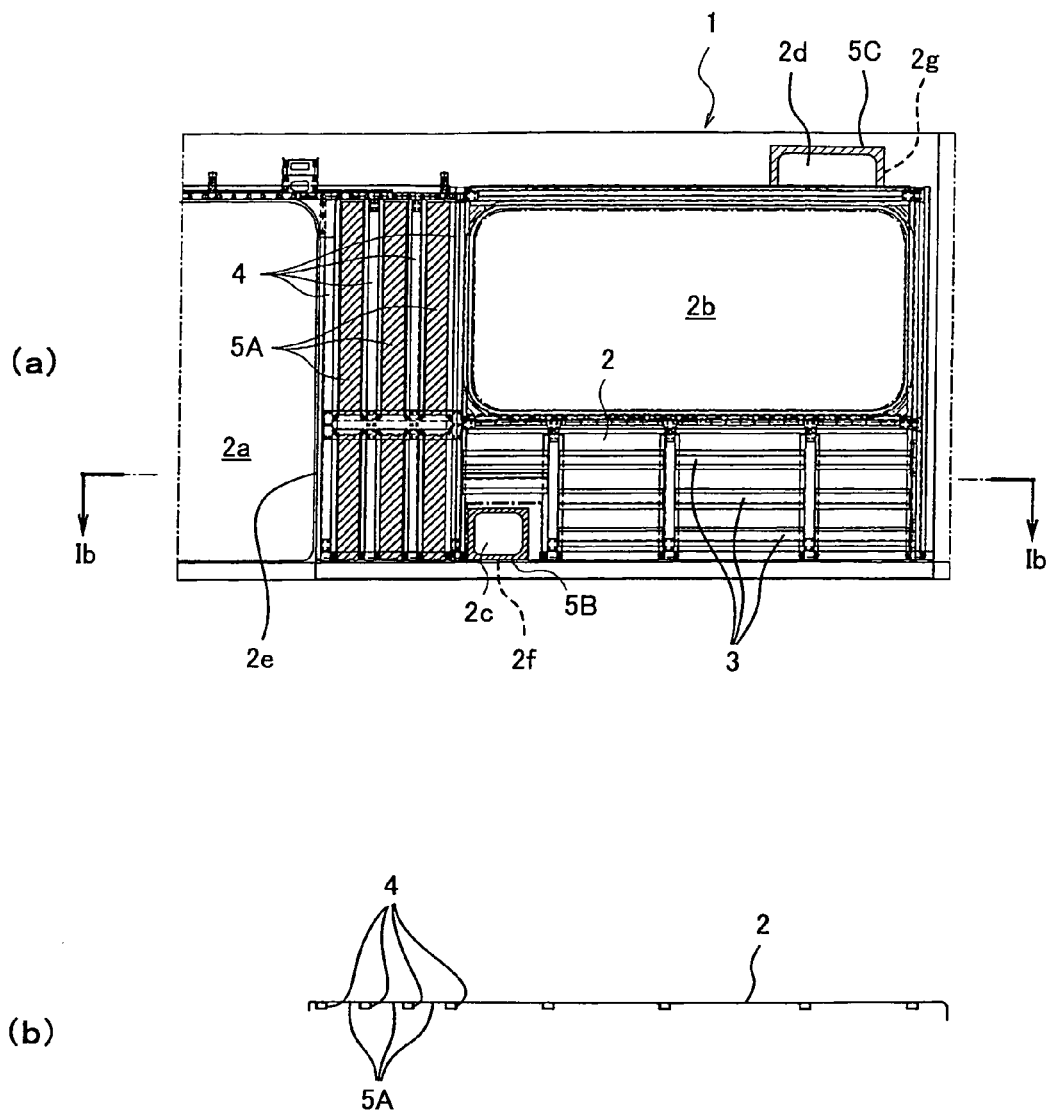
FIG. 1(a) is a front view of a side bodyshell 1 of a railcar according to an embodiment of the present invention when viewed from a car interior side.
FIG. 1(b) is a cross-sectional view taken along line Ib-Ib of FIG. 1(a).
Figure 2:
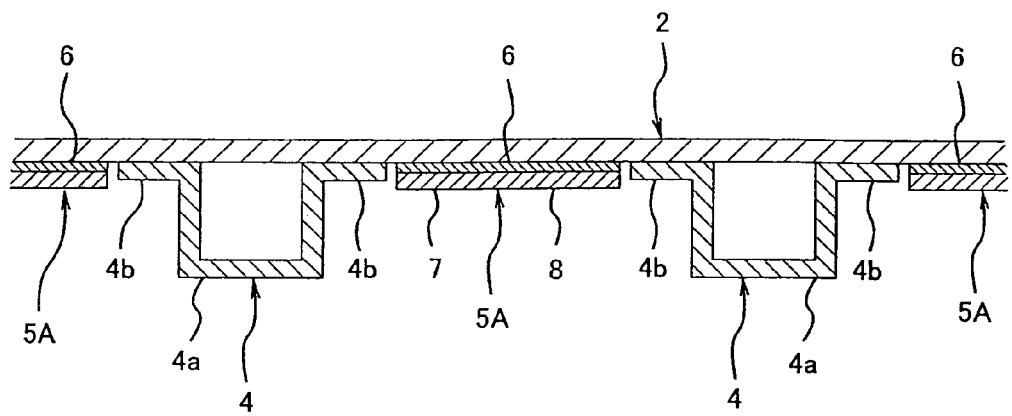
FIG. 2 is a major portion enlarged view of FIG. 1(b).

FIG. 1(a) is a front view of a side bodyshell 1 of a railcar according to the embodiment of the present invention when viewed from a car interior side. FIG. 1(b) is a cross-sectional view taken along line Ib-Ib of FIG. 1(a). FIG. 2 is a major portion enlarged view of FIG. 1(b). As shown in FIGS. 1 and 2, the side bodyshell 1 includes: a metal (for example, stainless steel) side outside plate 2 constituting a left or right side wall of a railcar bodyshell; a plurality of metal (for example, stainless steel) horizontal frame members 3 which are spaced apart from one another and extend in a railcar front-rear direction; a plurality of metal (for example, stainless steel) vertical frame members 4 which are spaced apart from one another and extend in a railcar upper-lower direction; and plate-shaped carbon fiber reinforced resin members 5A to 5D respectively joined to predetermined portions on an inner surface of the side outside plate 2.

The side outside plate 2 includes: a door opening 2a; a window opening 2b provided to be spaced apart from the door opening 2a in the front-rear direction; a lower opening 2c which is provided under the window opening 2b and smaller than the window opening 2b and to which a device is attached; and an upper opening 2d which is provided above the window opening 2b and smaller than the window opening 2b and to which a device is attached. Each of the openings 2*a* to 2*d* is formed in a substantially rectangular shape (In the present description, the "substantially rectangular shape" denotes not only a completely rectangular shape but also a rectangular shape whose corners are chamfered in a circular-arc shape.). The side outside plate 2 further includes a door pocket portion 2*e* between the door opening 2*a* and the window opening 2*b*, and a door is accommodated in the door pocket portion 2*e*.

Each of the horizontal frame members 3 includes: a main body portion 3*a* (see FIG. 6) which opens toward the side outside plate 2 and has a substantially horseshoe-shaped cross section; and flange portions 3*b* (see FIG. 6) which respectively project from opening end edges of the main body portion 3*a* in directions away from each other. The horizontal frame member 3 has a substantially hat-shaped cross section. The horizontal frame member 3 is joined to the inner surface of the side outside plate 2 such that the flange portions 3*b* are spot welded to the side outside plate 2.

Each of the vertical frame members 4 is joined to the inner surface of the side outside plate 2 or to the main body portions 3*a* of the horizontal frame members 3 so as to be orthogonal to the horizontal frame members 3. The vertical frame member 4 includes: a main body portion 4*a* which opens toward the side outside plate 2 and has a substantially horseshoe-shaped cross section; and flange portions 4*b* which respectively project from opening end edges of the main body portion 4*a* in directions away from each other. The vertical frame member 4 has a substantially hat-shaped cross section. The vertical frame member 4 is joined to the side outside plate 2 such that the flange portions 4*b* are spot welded to the inner surface of the side outside plate 2 or to inner surfaces of the horizontal frame members 3.

Each of the carbon fiber reinforced resin members 5A is joined to a portion on a car interior surface of the door pocket portion 2*e* of the side outside plate 2, the portion being located between the adjacent vertical frame members 4. The carbon fiber reinforced resin member 5A is larger in thickness than each of the frame members 3 and 4. A specific procedure of joining the carbon fiber reinforced resin member 5A is to: degrease the above portion between the adjacent vertical frame members 4 on the side outside plate 2; apply a primer 6 (for example, an epoxy resin), made of an impregnated adhesive resin, to the portion and leave it; apply an impregnated adhesive resin 8 (for example, epoxy resin) as an undercoating onto the solidified primer 6; stack a resin non-impregnated carbon fiber sheet 7 on the undercoating before the undercoating is solidified; further apply the impregnated adhesive resin 8 onto the carbon fiber sheet 7; infiltrate the impregnated adhesive resin 8 into the carbon fiber sheet 7 and flatten the surface of the carbon fiber sheet 7 by using, for example, a roller; and wait until the impregnated adhesive resin 8 is solidified. Thus, the carbon fiber reinforced resin member 5A adhering to the side outside plate 2 is formed. With this, together with the vertical frame members 4, the carbon fiber reinforced resin members 5A achieve the effect of reinforcing the door pocket portion 2*e* of the side outside plate 2. The carbon fiber reinforced resin member 5A is formed on the door pocket portion 2*e* such that a fiber direction thereof is substantially parallel to the railcar upper-lower direction. Here, the carbon fiber sheet 7 may be constituted by one layer or a plurality of layers.

In the present embodiment, each of the carbon fiber reinforced resin members 5A is provided between the adjacent vertical frame members 4, so that the number of vertical frame members 4 is reduced from six in a conventional case to four. As above, in the case of securing similar stiffness to the conventional side bodyshell, the number of vertical frame members 4 can be reduced. Therefore, the side bodyshell 1 can be reduced in weight. Moreover, the conventional spot welding is spot joining, and load share depends on the number of spots of the spot welding. However, the carbon fiber reinforced resin member 5A formed by the impregnation and adhesion of the carbon fiber sheet 7 with respect to the side outside plate 2 is surface-joined over the entire sheet. Therefore, a load share per unit area can be made smaller than conventional cases.

Figure 3:
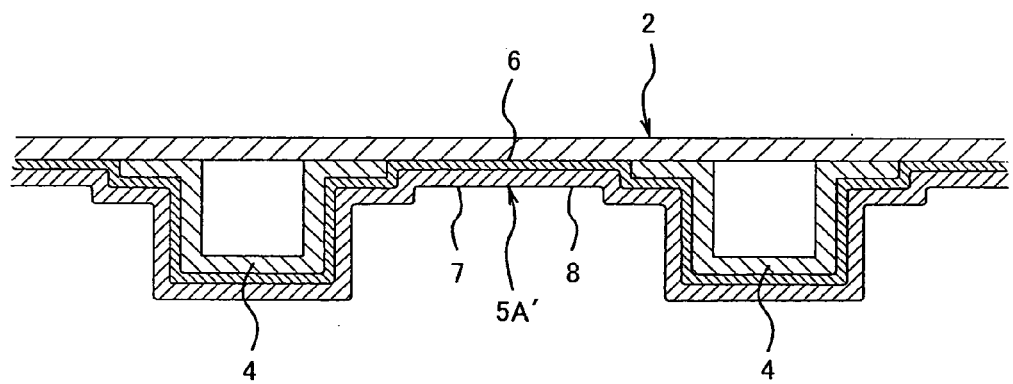
FIG. 3 is a diagram of Modification Example and corresponds to FIG. 2.

In the above example, the carbon fiber reinforced resin member 5A is provided between the vertical frame members 4. However, the present embodiment is not limited to this. For example, as shown in FIG. 3, a carbon fiber reinforced resin member 5A' may be formed such that: a plurality of vertical frame members 4 are joined to the inner surface of the side outside plate 2; the primer 6 is applied to cover the entire inner surface; the carbon fiber sheet 7 is provided to cover the entire inner surface; and the carbon fiber sheet 7 is impregnated with the impregnated adhesive resin 8. In this case, since the resin non-impregnated carbon fiber sheet 7 has flexibility, the carbon fiber sheet 7 can be provided so as to spread along a wavy portion formed such that a plurality of vertical frame members 4 are joined to the inner surface of the side outside plate 2 so as to be spaced apart from one another. Then, the carbon fiber sheet 7 can be easily impregnated with the impregnated adhesive resin 8 and adhered to the impregnated adhesive resin 8, and this process is easy, too.

Figure 4:
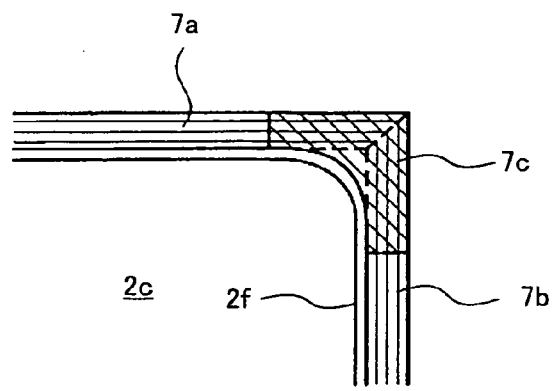
FIG. 4 is a diagram for explaining reinforcement of a lower opening of Modification Example.

Moreover, as shown in FIG. 1(*a*), the carbon fiber reinforced resin member 5B having an annular shape corresponding to a peripheral portion 2*f* defining the lower opening 2*c* is joined to an entire periphery of the peripheral portion 2*f* of the inner surface of the side outside plate 2, and the carbon fiber reinforced resin member 5C having an annular shape corresponding to a peripheral portion 2*g* defining the upper opening 2*d* is joined to an entire periphery of the peripheral portion 2*g* of the inner surface of the side outside plate 2. A specific procedure of joining the carbon fiber reinforced resin members 5B and 5C is the same as that of the carbon fiber reinforced resin member 5A. Moreover, since the resin non-impregnated carbon fiber sheet can be easily cut, the annular carbon fiber reinforced resin members 5B and 5C can be easily formed. In the above example, the annular carbon fiber reinforced resin members 5B and 5C are used. However, the present embodiment is not limited to this. The carbon fiber reinforced resin member may be divided into a plurality of parts. For example, as shown in FIG. 4, a carbon fiber sheet 7*a* extending in the carbody front-rear direction and a carbon fiber sheet 7*b* extending in the carbody upper-lower direction may be provided to face each other at a corner portion of the peripheral portion 2*f*, and a carbon fiber sheet 7*c* may be further stacked on this facing portion. In this case, the fiber directions of the carbon fiber sheets 7*a* and 7*b* are the carbody front-rear direction and the carbody upper-lower direction, respectively. The fiber direction of the carbon fiber sheet 7*c* is set such that an imaginary extended line in this fiber direction is inclined at an angle (for example, substantially 45° with respect to each of the upper-lower direction and the front-rear direction) so as not to intersect with the opening 2*c*. FIG. 4 shows the lower opening 2*c*, but the same is true for the upper opening 2*d*.

As explained above, each of the fiber reinforced resin members 5A to 5C is joined to a predetermined portion including a part of the portion between the vertical frame members 4 of the side outside plate 2 or including the peripheral portion 2*f* or 2*g* defining the opening 2*c* or 2*d*. Therefore, the weld marks of the welding for reinforcing the side outside plate 2 are suppressed, the occurrence of the dimensional error by the thermal distortion is suppressed, and a distortion removal work is significantly reduced. Moreover, this process of joining the fiber reinforced resin members 5A to 5C is easy. Moreover, by reinforcing the predetermined portions by the fiber reinforced resin members 5A to 5C, the number of metal frame members can be reduced, and the weight of the carbody and the number of manufacturing man-hours can also be reduced. Therefore, the appearance, manufacturing accuracy, producibility, and the like improve. In addition, each of the portions at which the fiber reinforced resin members 5A to 5D are provided are limited to the predetermined portion including a part of the portion between the vertical frame members 4 or including the peripheral portion 2f or 2g defining the opening 2b or 2c, and the major portions constituted by the side outside plates 2, the horizontal frame members 3, and the vertical frame members 4 are made of metal. Therefore, the waste can be reduced, and the recyclability can be adequately maintained. With this, both improving the appearance, manufacturing accuracy, and producibility of the railcar bodyshell and adequately maintaining the recyclability of the railcar bodyshell can be preferably realized. In addition, the resin non-impregnated fiber sheet 7 has the flexibility. Therefore, the fiber reinforced resin members 5A to 5C can be easily formed by spreading the fiber sheet along the predetermined portion of the side outside plate 2, impregnating the fiber sheet with the impregnated adhesive resin, and adhering the fiber sheet by the impregnated adhesive resin. Thus, the side bodyshell 1 can be reinforced by this simple process.

Figure 5:
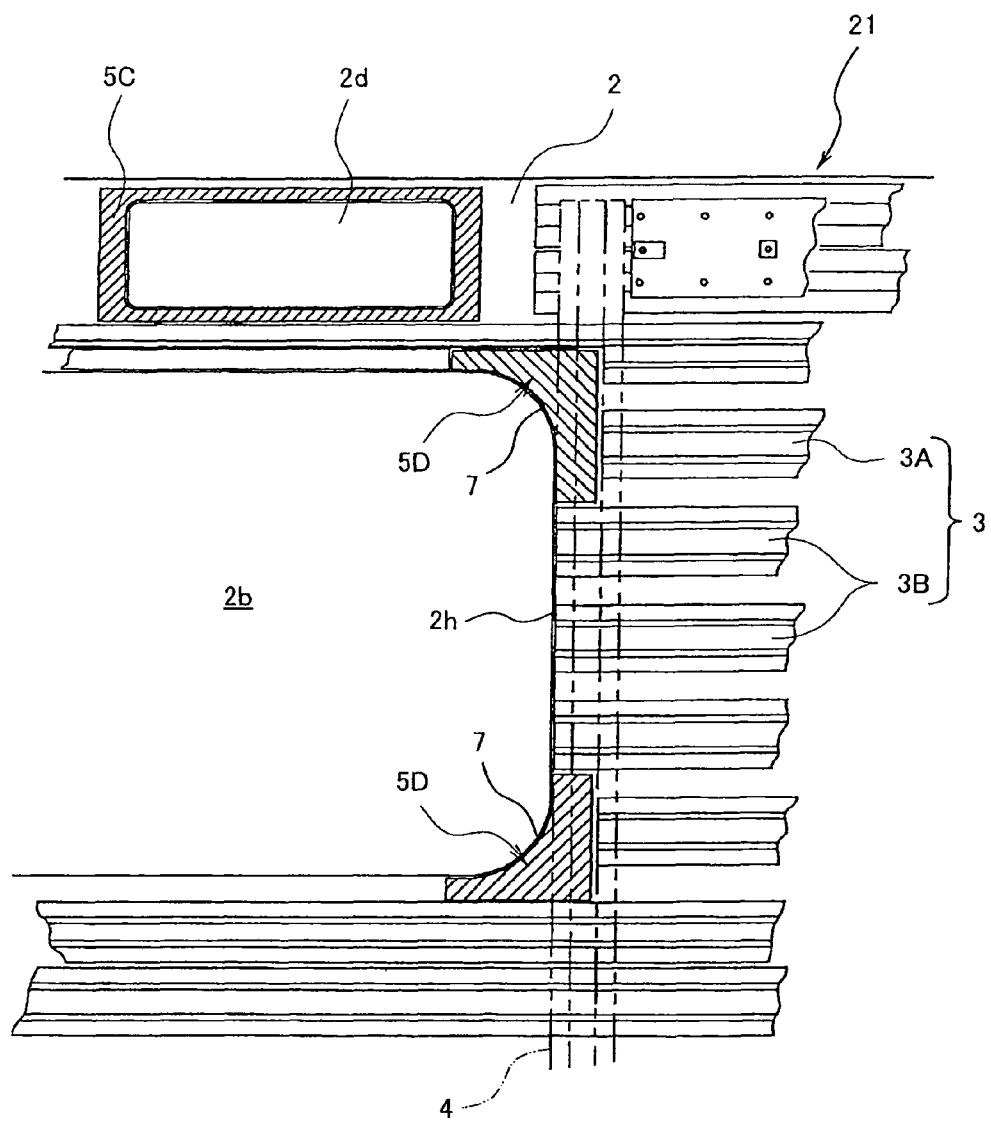
FIG. 5 is a major portion enlarged view of the vicinity of a window opening of the side bodyshell of another embodiment.
Figure 6:
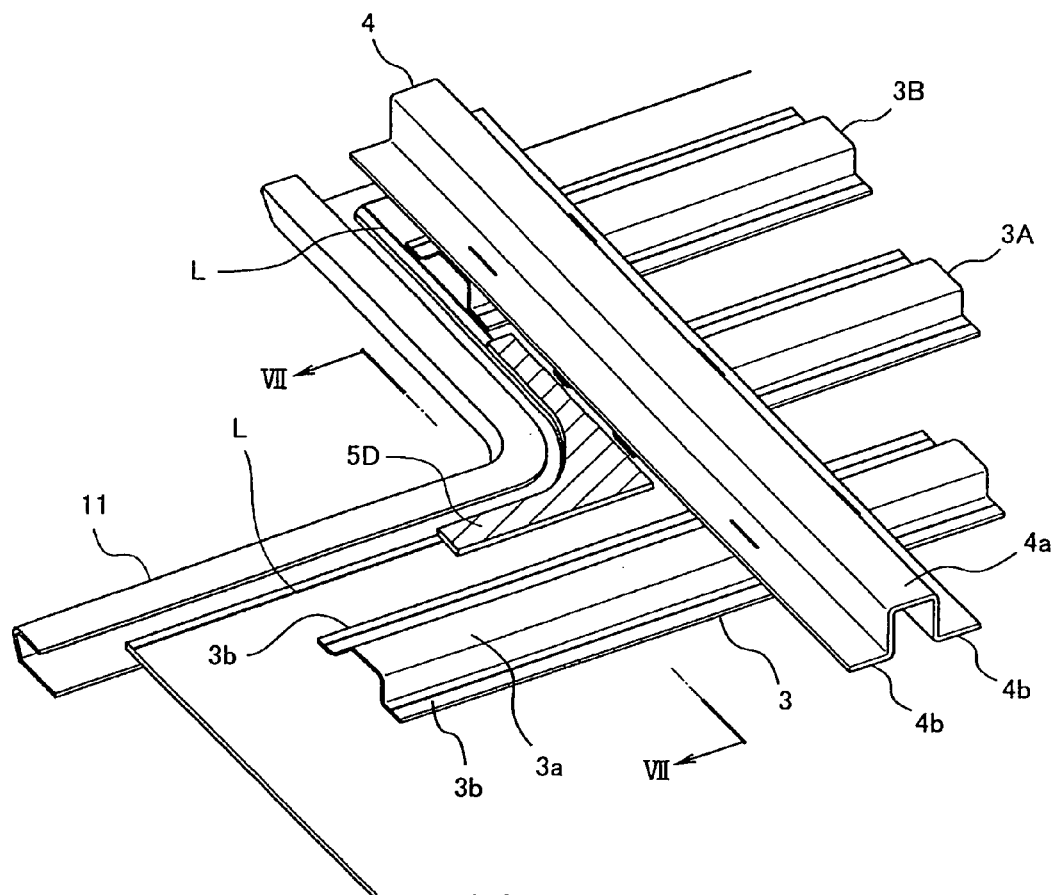
FIG. 6 is a major portion enlarged perspective view showing major portions of FIG. 5.
Figure 7:
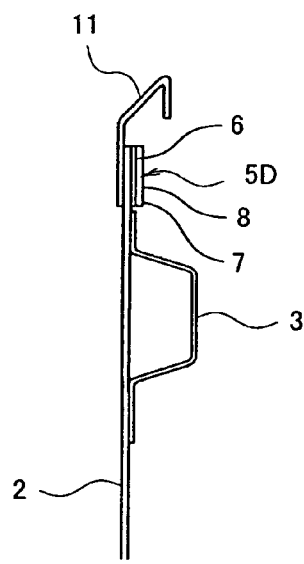
FIG. 7 is a cross-sectional view taken along line VII-VII of FIG. 6.

FIG. 5 is a major portion enlarged view of the vicinity of the window opening 2b of a side bodyshell 21 of another embodiment. FIG. 6 is a major portion enlarged perspective view showing major portions of FIG. 5. FIG. 7 is a cross-sectional view taken along line VII-VII of FIG. 6. In FIG. 5, the window frame is not shown. As shown in FIGS. 5 to 7, in the side bodyshell 21 of the present embodiment, a plurality of horizontal frame members 3 are laser welded to the inner surface of the side outside plate 2, and the vertical frame member 4 is laser welded to the main body portions 3a of the horizontal frame members 3 so as to be orthogonal to the horizontal frame members 3. To be specific, in the side bodyshell 21, all of the frame members 3 and 4 are not spot welded but laser welded.

Specifically, the flange portions 3b of the horizontal frame member 3 are placed on the inner surface of the side outside plate 2 on the car interior side. Then, the flange portions 3b are continuously irradiated with a laser beam from a normal direction on the car interior side to be heated and melted up to an inner portion of the side outside plate 2. A laser beam output or a beam travel speed is controlled such that the bottom of a molten pool generated by the laser irradiation does not reach the outer surface of the side outside plate 2 on the car exterior side. Thus, the horizontal frame members 3 are joined to the side outside plate 2. Therefore, the deterioration of the appearance of the side bodyshell by the weld marks is prevented. Moreover, the vertical frame member 4 is the same as the horizontal frame member 3 in that the deterioration of the appearance of the side bodyshell by the weld marks is prevented by controlling the laser beam output or the beam travel speed. In a case where a plurality of metal plates are joined to one another to form the side outside plate 2, these plates are laser welded to one another in the same manner as above.

The carbon fiber reinforced resin members 5D each having a substantially L shape are respectively joined to four corner portions of a peripheral portion 2h defining the window opening 2b on the inner surface of the side outside plate 2. A specific procedure of joining the carbon fiber reinforced resin member 5D is the same as that of the carbon fiber reinforced resin member 5A. Among a plurality of horizontal frame members 3, a horizontal frame member 3A whose extended line interferes with the corner portion of the peripheral portion 2g is provided to be spaced apart from the window opening 2b by a distance longer than a distance between the window opening 2b and a horizontal frame member 3B. This is because the carbon fiber reinforced resin member 5D is provided on the inner surface at the corner portion of the peripheral portion 2g.

A metal (for example, stainless steel) window frame 11 is laser welded to the outer surface of the peripheral portion 2h of the window opening 2b of the side outside plate 2. In FIG. 6, the reference sign L denotes a laser weld bead. Specifically, the window frame 11 is placed to overlap with the outer surface of the peripheral portion 2h on the car exterior side. Then, the overlapping portion is continuously irradiated with the laser beam from the normal direction on the car interior side to be heated and melted up to an inner portion of the window frame 11. The laser beam output or the beam travel speed is controlled such that the bottom of the molten pool generated by the laser irradiation does not reach the outer surface of the window frame 11.

After the window frame 11 is laser welded to the peripheral portion 2h of the window opening 2b of the side outside plate 2, the carbon fiber reinforced resin member 5D is joined to a position overlapping with the portion where the window frame 11 and the side outside plate 2 are joined to each other when viewed from the normal direction of the side outside plate 2. Here, the laser weld bead L, which is a continuous undulation of base materials melted by the laser irradiation, is generated on the inner surface of the peripheral portion 2h of the side outside plate 2. However, since the carbon fiber reinforced resin member 5D is formed such that the carbon fiber sheet 7 is adhered by the impregnated adhesive resin 8, the carbon fiber sheet 7 can smoothly spread along and cover the laser weld bead L. Therefore, the step of removing the bead can be omitted. Moreover, the vertical frame member 4 is laser welded to an upper surface of the horizontal frame member 3. Specifically, when viewed from the normal direction of the car interior side of the side outside plate 2, the vertical frame member 4 is provided above the carbon fiber reinforced resin member 5D so as to overlap a part of the carbon fiber reinforced resin member 5D. With this, the vertical frame member 4 can be provided at a position close to the window opening 2b. After the horizontal frame members 3, the vertical frame members 4, and the window frame 11 are laser welded to the side outside plate 2, the carbon fiber reinforced resin members 5D are adhered to the side outside plate 2. Thus, the step of the laser welding can be performed all at once. The vertical frame members 4 may be laser welded to the upper surfaces of the horizontal frame members 3 after the horizontal frame members 3, the window frame 11 are laser welded to the side outside plate 2, and the carbon fiber reinforced resin members 5D are adhered to the side outside plate 2.

The fiber direction of each of the carbon fiber sheets 7 at four corners is set such that an imaginary extended line in this fiber direction is inclined at an angle (for example, substantially 45° with respect to each of the upper-lower direction and the front-rear direction) so as not to intersect with the window opening 2b. Hereinafter, the reason for this will be explained.

Figure 8:
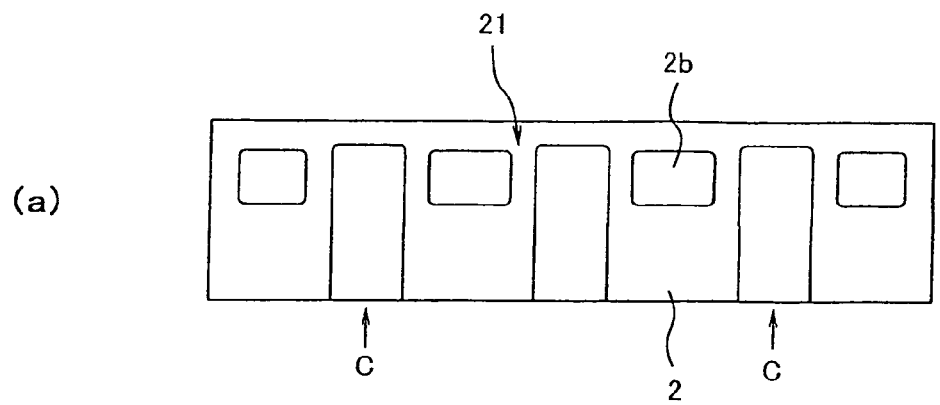
FIG. 8 are schematic diagrams each for explaining a load applied to a railcar bodyshell.
Figure 8:
Figure 8:
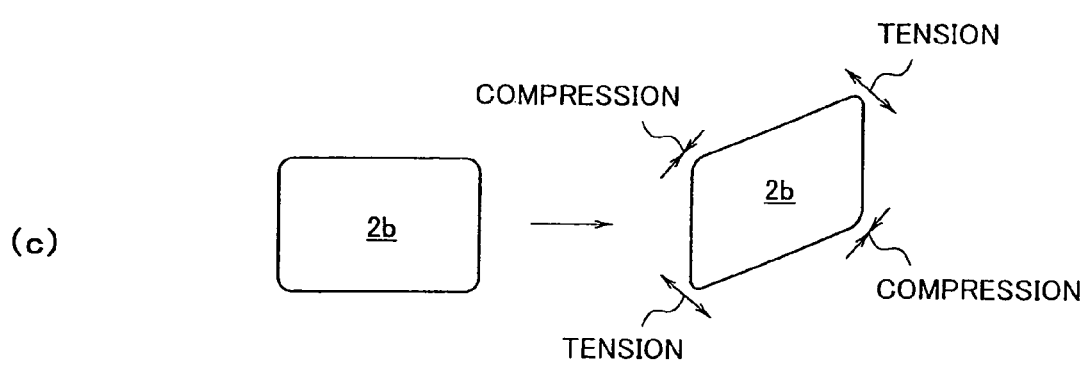

FIG. 8 are schematic diagrams each for explaining a load applied to the railcar bodyshell. FIG. 8(a) shows an unloaded state. FIG. 8(b) shows a state in which the bodyshell bends since passengers get therein, and the bending is maximum at the center of the bodyshell in the railcar front-rear direction. FIG. 8(c) shows deformation of the window opening 2b of the side outside plate 2. In FIG. 8(a), the reference sign C denotes a supporting point. When the passengers get in the railcar shown in FIG. 8(a), the side bodyshell 21 deforms as shown in FIG. 8(b). At this time, as shown in FIG. 8(c), the window opening 2b of the side outside plate 2 deforms in a substantially parallelogram shape. Tensile stress is generated at each of a pair of corner portions on a diagonal line of the peripheral portion defining the window opening 2b, and compressive stress is generated at each of another pair of corner portions on another diagonal line. Each of the tensile stress and the compressive stress is generated such that an imaginary extended line in its stress direction extends at an angle so as not to intersect with the window opening 2b, that is, at substantially 45° with respect to each of the upper-lower direction and the front-rear direction. Then, the carbon fiber reinforced resin has high strength and elasticity in its fiber direction. Therefore, the carbon fiber sheet 7D shown in FIGS. 5 and 6 is provided such that its fiber direction coincides with a direction in which high stress is generated.

Figure 9:
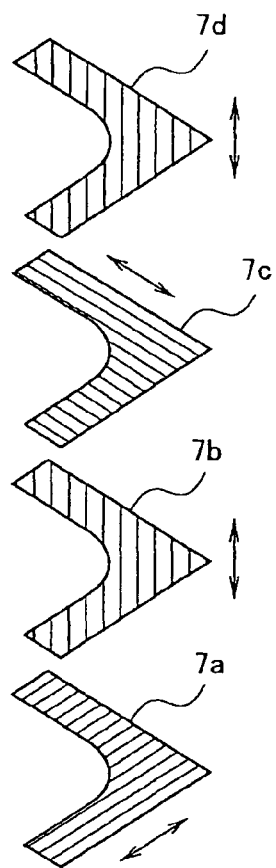
FIG. 9 is a diagram for explaining reinforcement of the window opening of Modification Example.

Here, Young's modulus of the carbon fiber reinforced resin significantly changes depending on its fiber direction. Therefore, the effect of reinforcement may be improved by stacking a plurality of carbon fiber sheets such that their fiber directions are different from one another. For example, as shown in FIG. 9, a plurality of carbon fiber sheets 7a to 7d may be formed in substantially the same shape and may be stacked on one another such that outer shapes thereof coincide with one another and their fiber directions are different from one another. At this time, the fiber direction of the carbon fiber sheet 7Da as a first layer is the railcar front-rear direction, and the fiber direction of the carbon fiber sheet 7b as a second layer is inclined at substantially 45° with respect to each of the railcar front-rear direction and the upper-lower direction (the imaginary extended line in this fiber direction does not intersect with the window opening 2b). Further, the fiber direction of the carbon fiber sheet 7c as a third layer is the railcar upper-lower direction, and the fiber direction of the carbon fiber sheet 7d as a fourth layer is the same as that of the first layer. However, the present embodiment is not limited to this. A plurality of carbon fiber sheets may be stacked on one another such that their fiber directions are orthogonal to one another. Moreover, the carbon fiber sheet may be formed to have a fabric or knit configuration.

Figure 10:
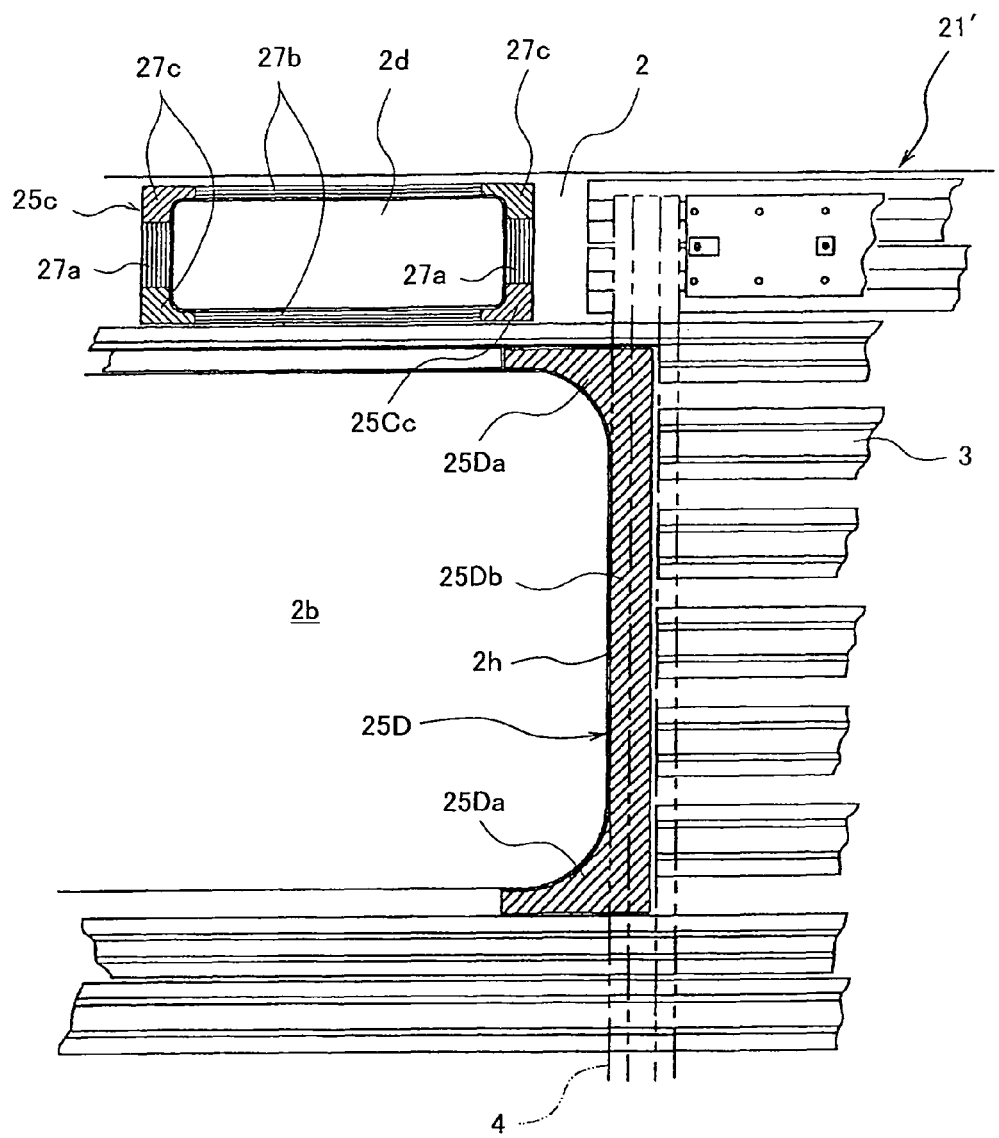
FIG. 10 is a major portion front view showing yet another embodiment of the side bodyshell to which a carbon fiber reinforced resin member is joined.

FIG. 10 is a major portion front view showing yet another embodiment of a side bodyshell 21' to which the carbon fiber reinforced resin member is joined. As shown in FIG. 10, a carbon fiber reinforced resin member 25D may be formed to include corner parts 25Da and an intermediate part 25Db so as to cover corner portions of the peripheral portion 2h of the window opening 2b of the side outside plate 2 of the side bodyshell 21' and a vertical-side intermediate portion connecting the corner portions of the peripheral portion 2h. The corner parts 25Da and the intermediate part 25Db may be formed integrally or separately.

Moreover, a carbon fiber reinforced resin member 25C formed by using a plurality of carbon fiber sheets 27a to 27c is joined to the upper opening 2d of FIG. 10. At this time, the fiber direction of the carbon fiber sheet 27a provided along a vertical side of the upper opening 2d is the railcar upper-lower direction, and the fiber direction of the carbon fiber sheet 27b provided along a horizontal side of the upper opening 2d is the railcar front-rear direction. The fiber direction of the carbon fiber sheet 27c provided along the corner portion of the upper opening 2d is inclined at substantially 45° with respect to each of the railcar front-rear direction and the upper-lower direction (the imaginary extended line in this fiber direction does not intersect with the upper opening 2d). In this case, an end portion of the carbon fiber sheet 27a and an end portion of the carbon fiber sheet 27b may be provided to face each other, and the carbon fiber sheet 27c may be stacked on a corner portion that is this facing portion. Moreover, to reinforce a portion extending in an opening front-rear direction and a portion extending in an opening upper-lower direction, an opening peripheral edge may be surrounded by using a bidirectional sheet having carbon fiber reinforcement extending in these directions.

Figure 11:
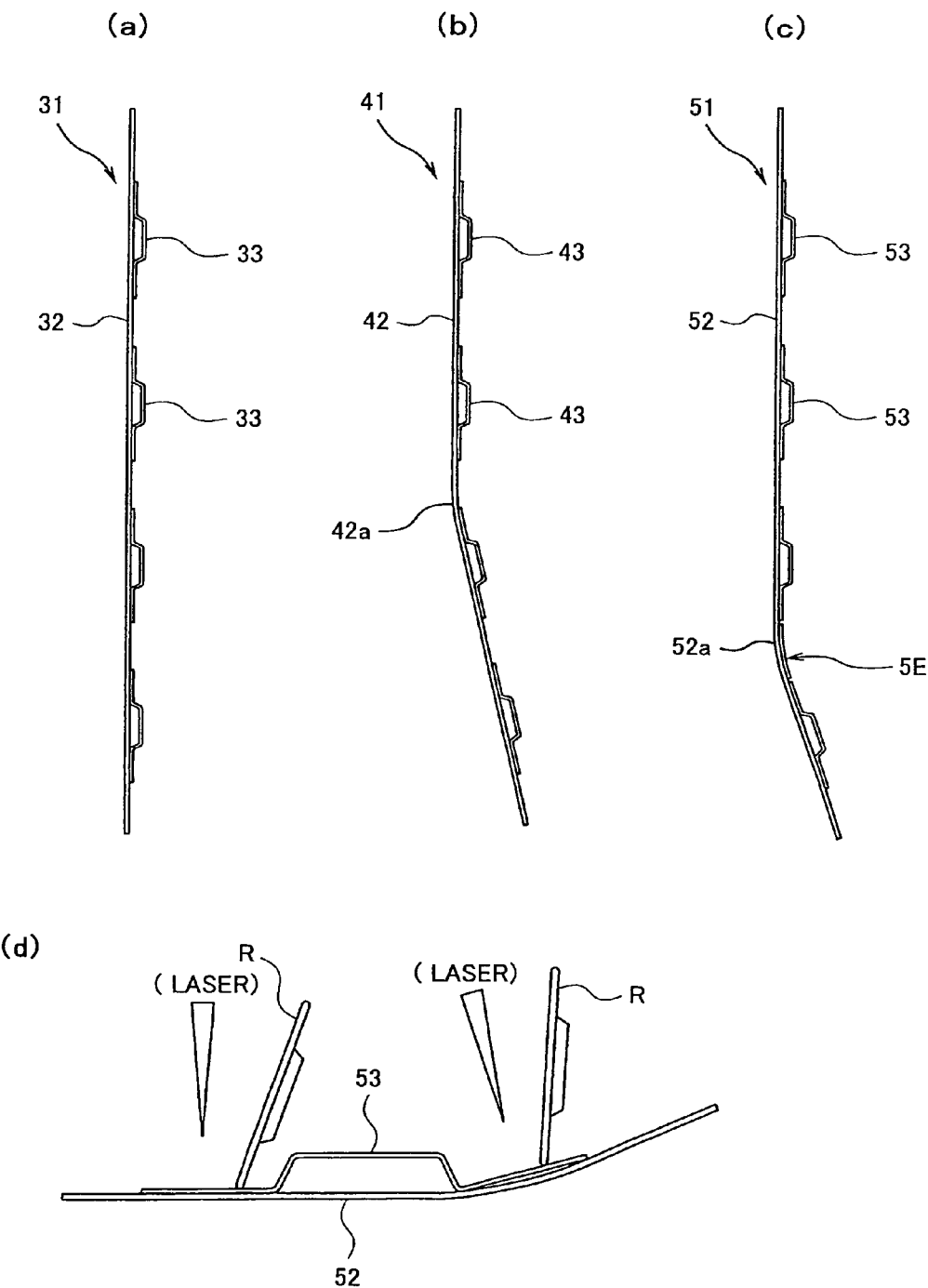
FIG. 11(a) is a longitudinal sectional view of a straight side bodyshell when viewed from the railcar front-rear direction.
FIG. 11(b) is a longitudinal sectional view of a side bodyshell including a curved portion having a large curvature radius.
FIG. 11(c) is a longitudinal sectional view of a side bodyshell including a curved portion having a small curvature radius.
FIG. 11(d) is a diagram for explaining laser welding with respect to the curved portion having the small curvature radius.

FIG. 11(a) is a longitudinal sectional view of a straight side bodyshell 31 when viewed from the railcar front-rear direction. FIG. 11(b) is a longitudinal sectional view of a side bodyshell 41 including a curved portion having a large curvature radius. FIG. 11(c) is a longitudinal sectional view of a side bodyshell 51 including a curved portion having a small curvature radius. FIG. 11(d) is a diagram for explaining the laser welding with respect to the curved portion having the small curvature radius. In the case of manufacturing the side bodyshell by the laser welding, it is desirable to use, as a side outside plate 32, a plate member extending substantially straightly in the railcar upper-lower direction (FIG. 11(a)). With this, horizontal frame members 33 can be surely joined to the side outside plate 32. However, because of construction gauge and railcar gauge, in many cases, the side outside plate has a curved portion formed such that a lower portion thereof is bent toward the railcar interior side (FIGS. 11(b) and 11(c)). As shown in FIG. 11(b), in a case where the curvature radius (for example, 1,500 mm) of a curved portion 42a of a side outside plate 42 is large, horizontal frame members 43 can be caused to closely contact the side outside plate 42 to be joined to the side outside plate 42 by using a pressure roller R. In contrast, as shown in FIG. 11(c), in a case where the curvature radius (for example, 500 mm) of a curved portion 52a of a side outside plate 52 is small, a horizontal frame member 53 cannot be caused to closely contact the side outside plate 52 without applying significantly high pressure to the horizontal frame member 53 by the pressure roller R as shown in FIG. 11(d). Therefore, the laser welding cannot be used.

In this case, as shown in FIG. 11(c), the horizontal frame members 53 are joined to portions other than the curved portion 52a. Here, to avoid a decrease in stiffness of the curved portion 52a, a plate-shaped carbon fiber reinforced resin member 5E may be joined to an inner surface of the curved portion 52a so as to be located between the adjacent horizontal frame members 53. At this time, the fiber direction of the carbon fiber reinforced resin member 5E is the railcar upper-lower direction. A method for forming the carbon fiber reinforced resin member 5E is the same as that of the above-described carbon fiber reinforced resin member 5A. As above, the horizontal frame member 53 cannot be provided on a portion of the side outside plate 52, the portion having the small curvature radius. Therefore, necessary stiffness of the side bodyshell 51 can be secured by providing the carbon fiber reinforced resin member 5E.

As explained above, in the railcar bodyshell manufactured by using the laser welding, the fiber reinforced resin members 5D, 25D, and 5E are joined to the predetermined portions, such as the corner portions of the peripheral portion 2h defining the opening 2b of the side outside plate 2. Therefore, the weld marks does not remain for the reinforcement of the side outside plate 2, and the dimensional error due to the thermal distortion does not occur. Therefore, the distortion removal work is significantly reduced, and this process of joining the fiber reinforced resin members 5D, 25D, and 5E is easy. Thus, the appearance, manufacturing accuracy, producibility, and the like improve. In addition, the portions at which the fiber reinforced resin members 5D, 25D, and 5E are provided are only the predetermined portions, such as the corner portions of the peripheral portion 2h defining the opening 2b, and the major portions constituted by the side outside plates 2, the horizontal frame members 3, and the vertical frame members 4 are made of metal. Therefore, the waste can be reduced, and the recyclability can be adequately maintained. With this, both improving the appearance, manufacturing accuracy, and producibility of the railcar bodyshell and adequately maintaining the recyclability of the railcar bodyshell can be preferably realized. In addition, the resin non-impregnated fiber sheet 7 has the flexibility. Therefore, the fiber reinforced resin members 5D, 25D, and 5E can be easily formed by spreading the fiber sheet along the predetermined portion of the side outside plate 2, impregnating the fiber sheet with the impregnated adhesive resin, and adhering the fiber sheet by the impregnated adhesive resin. Thus, the side bodyshells 21, 21', and 51 can be reinforced by this simple process.

The required shape and size of the carbon fiber sheet, the required number of carbon fiber sheets stacked, and the like are determined in accordance with individual design conditions. Moreover, the side outside plate and the frame member are not limited to stainless steel and may be, for example, aluminum alloy. The present embodiment has explained an example in which a reinforcing structure using the carbon fiber reinforced resin is applied to the side bodyshell 1. However, the present embodiment is not limited to this, and the reinforcing structure may be applied to the end bodyshell. Moreover, the reinforcing structure using the carbon fiber reinforced resin can be applied to not only the side bodyshell and the end bodyshell but also a floor panel of the underframe.

Figure 12:
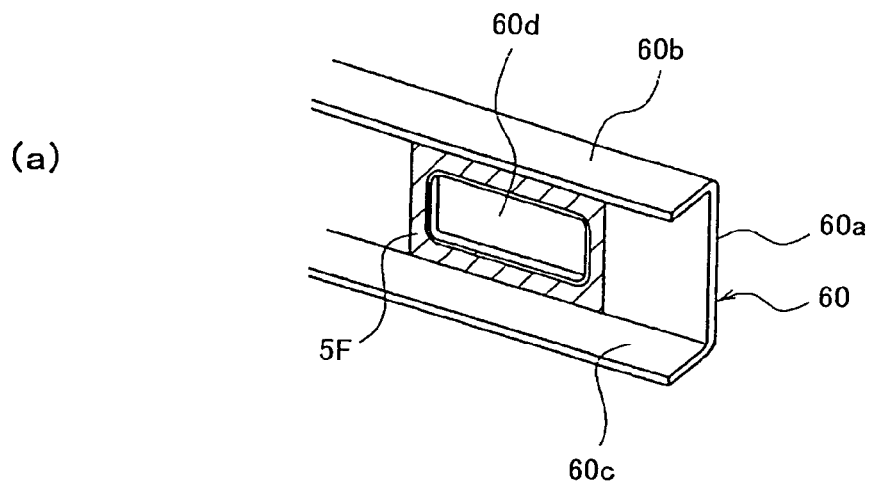
FIG. 12(a) is a major portion perspective view of a cross beam of an underframe.
FIG. 12(b) is a major portion perspective view of a conventional cross beam.
Figure 12:
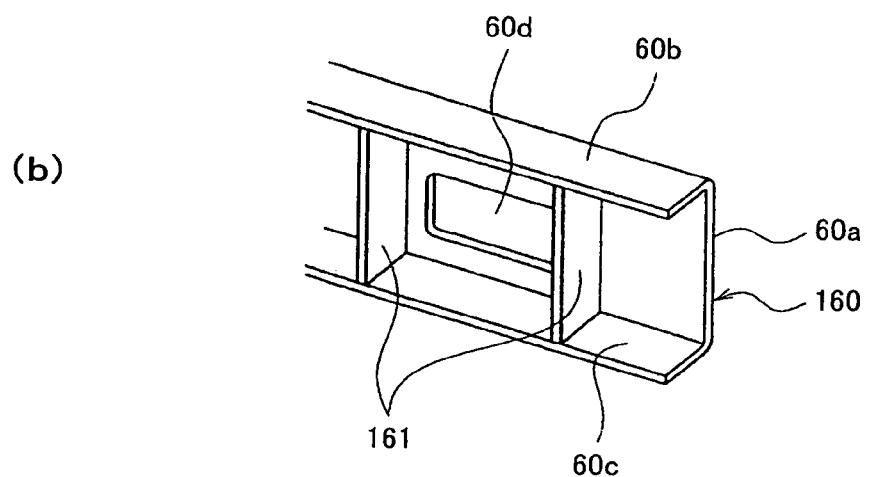
Figure 13:
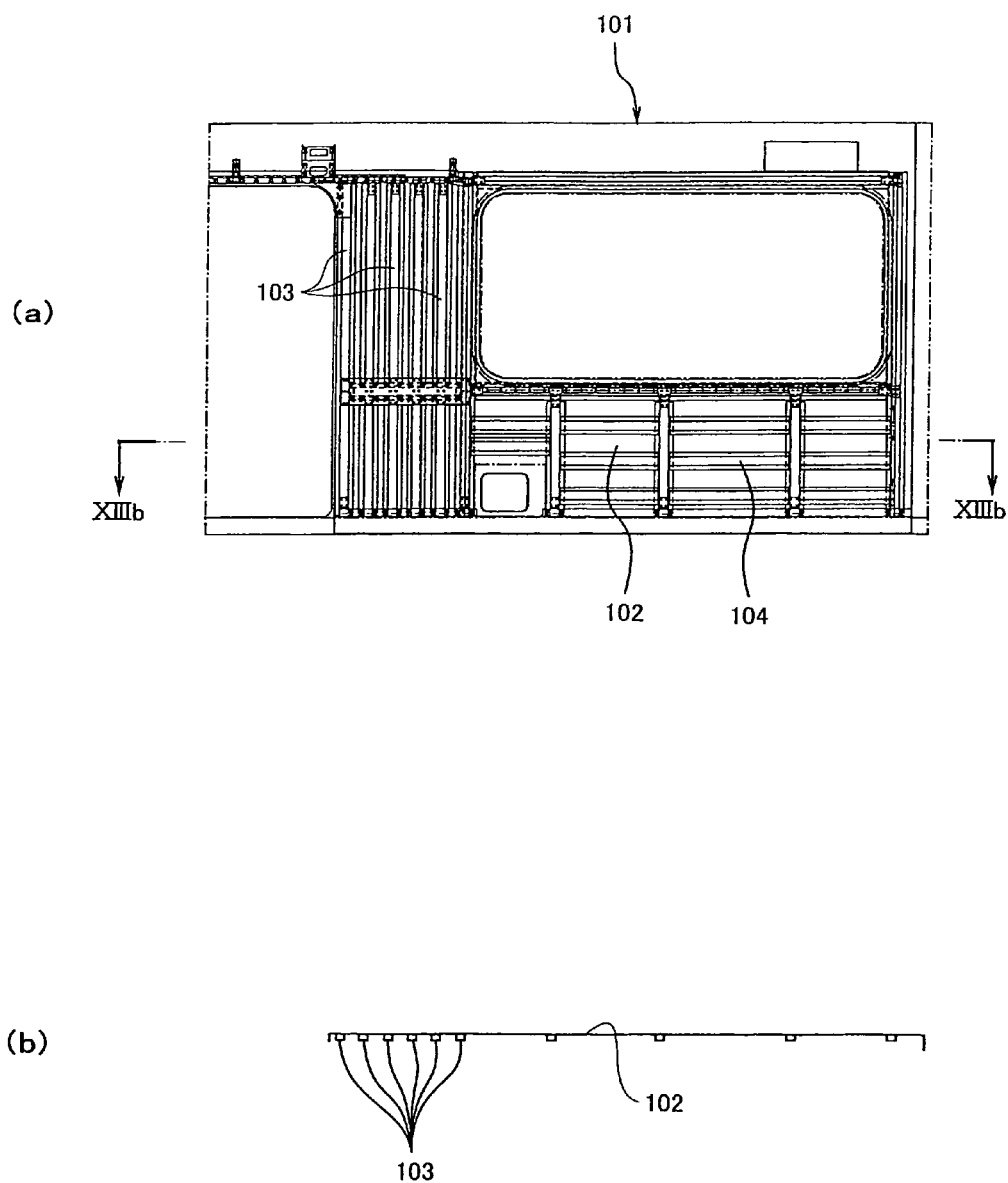
FIG. 13(a) is a front view of the side bodyshell of a conventional railcar when viewed from the car interior side.
FIG. 13(b) is a cross-sectional view taken along line XIIIB-XIIIB of FIG. 13(a).
Figure 14:
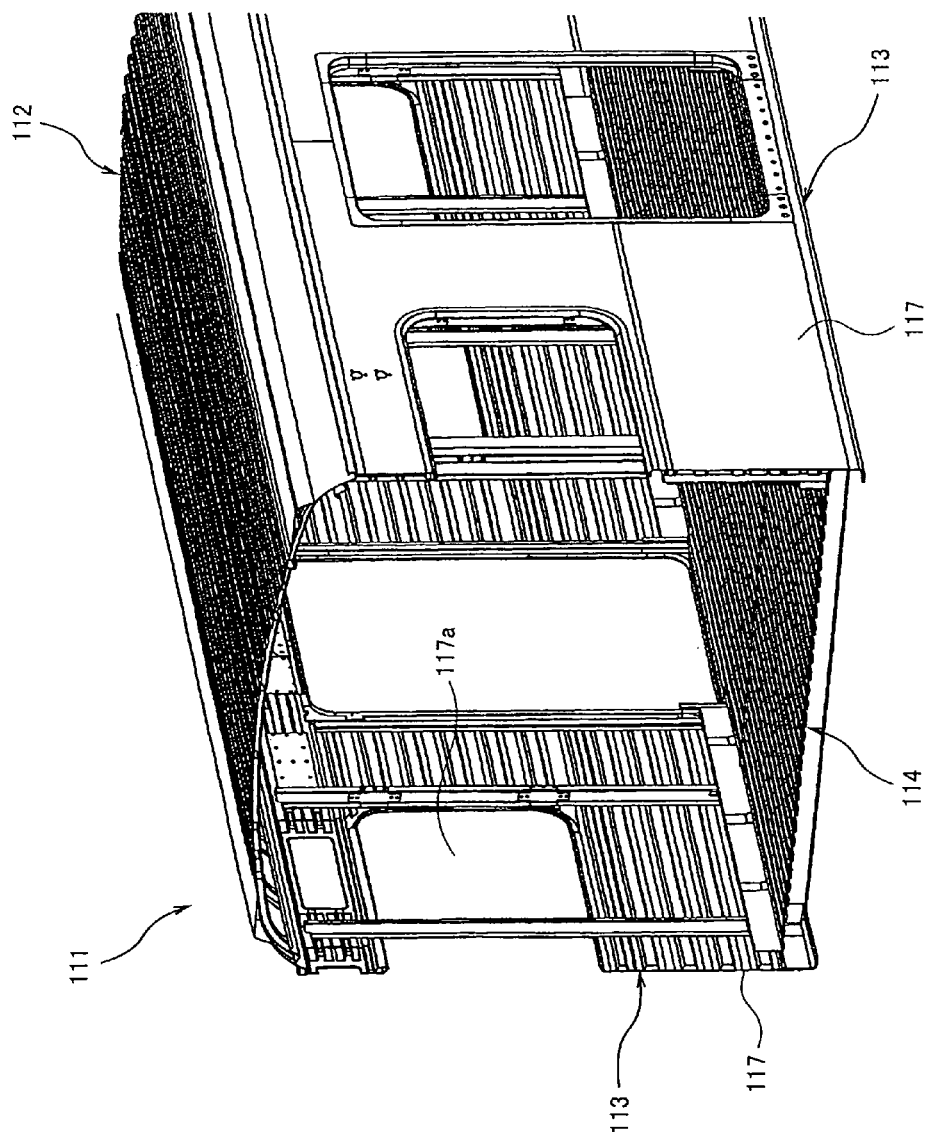
FIG. 14 is a perspective view showing the bodyshell in which respective members of the conventional railcar are laser welded to one another.
Figure 15:
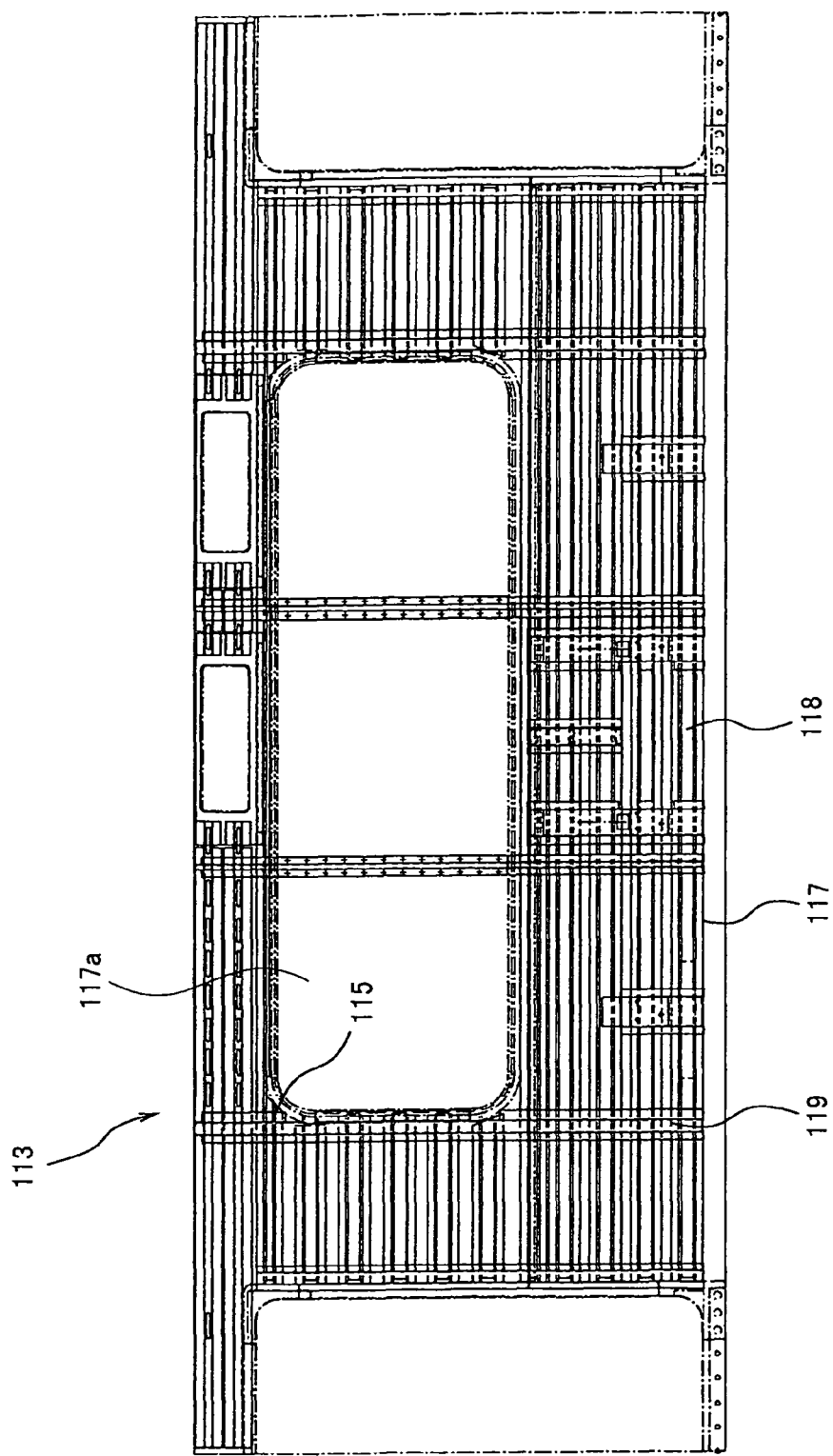
FIG. 15 is a front view of the side bodyshell of FIG. 14 when viewed from the car interior side.
Figure 16:
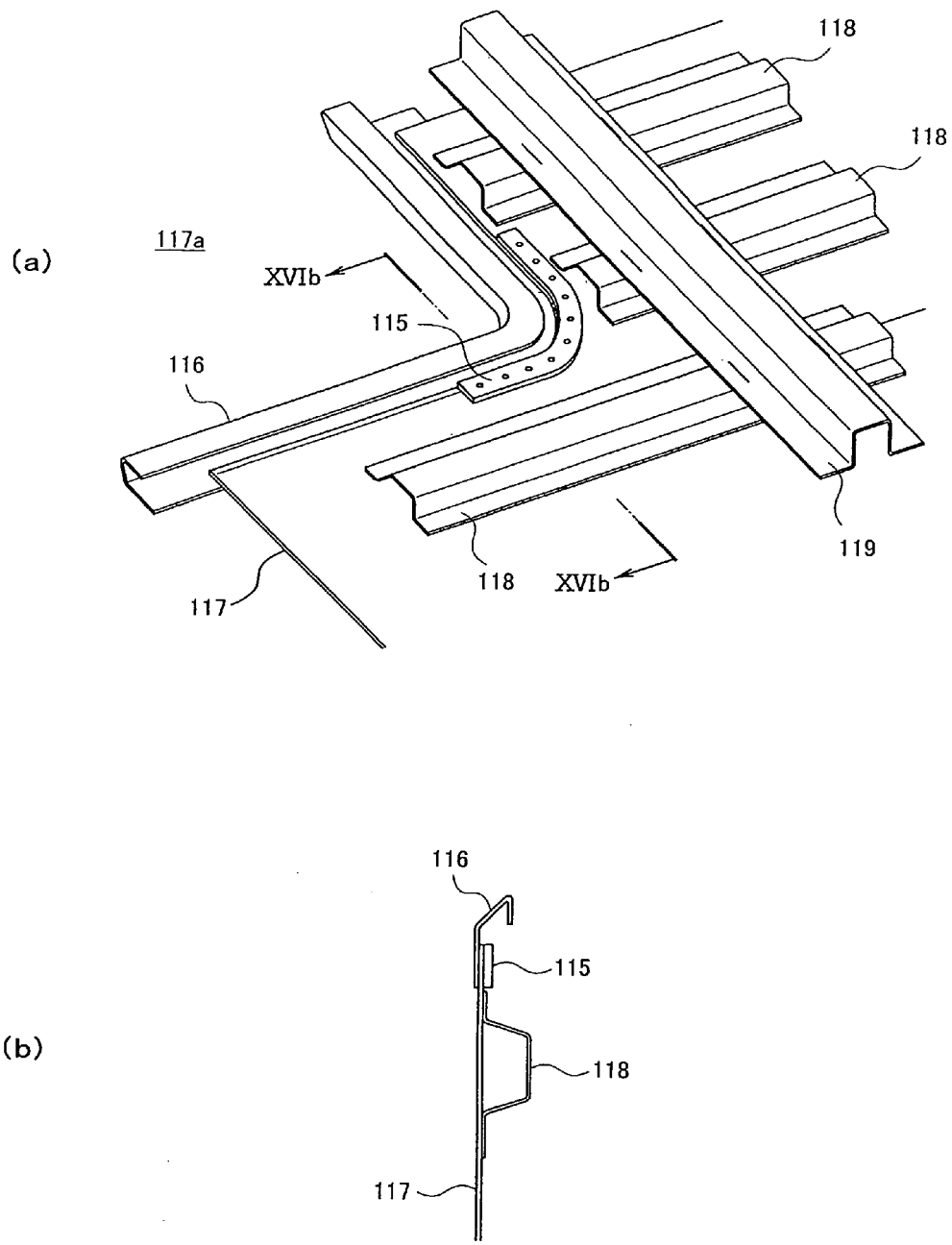
FIG. 16(a) is a major portion enlarged view showing the vicinity of the window opening of the side bodyshell of FIG. 15.
FIG. 16(b) is a cross-sectional view taken along line XVIb-XVIb of FIG. 16(a).

FIG. 12(a) is a major portion perspective view of a cross beam 60 of the underframe. FIG. 12(b) is a major portion perspective view of a conventional cross beam 160. As shown in FIG. 12(b), the conventional cross beam 160 includes a substrate portion 60a extending in the upper-lower direction and horizontal portions 60b and 60c which are respectively located at upper and lower end edges of the substrate portion 60a and extend in the same direction in parallel. Further, the substrate portion 60a has a duct opening 60d. Reinforcing ribs 161 are respectively provided on both sides of the duct opening 60d to avoid a decrease in bending stiffness. Here, the flatness of the underframe is an important factor for the underframe to achieve its function. However, the underframe distorts by the heat generated when the reinforcing ribs 161 are welded to the cross beam 160. As shown in FIG. 12(a), in the cross beam 60 of the present invention, the reinforcing ribs 161 are not provided, but a carbon fiber reinforced resin member 5F having an annular plate shape surrounding the duct opening 60d is provided on the substrate portion 60a. With this, the decrease in bending stiffness is prevented. Moreover, since it is unnecessary to weld the reinforcing ribs, the thermal distortion does not occur. With this, the manufacturing accuracy of the underframe which requires high flatness can be improved. In addition, works for removing the distortion can be significantly reduced.

Hereinafter, Example of a process procedure of joining the carbon fiber reinforced resin member to the railcar bodyshell will be explained. The process is carried out at an ambient temperature of about 0 to 40° C. First, carbon fiber sheets, primers, and impregnated adhesive resins are prepared. Used as the carbon fiber sheet is a highly-elastic unidirectional material (FTS-C8-30 produced by Nippon Steel Composite Co., Ltd.). Properties of carbon fiber contained in the carbon fiber sheet are as follows: Tensile strength is 1,900 N/mm$^2$, and tensile elasticity is $6.4 \times 10^5$ N/mm$^2$. Used as the primer is a two-liquid mixing type epoxy resin (FP-NSL produced by Nippon Steel Composite Co., Ltd.: Viscosity of about 1,000 mPa·s). Used as the impregnated adhesive resin is a two-liquid mixing type epoxy resin (FR-E3PL produced by Nippon Steel Composite Co., Ltd.: Viscosity of about 4,400 mPa·s). Steps (1) to (7) below are carried out in order.

(1) Surface Preparation

A predetermined portion which requires reinforcement is grinded by a grinder (for example, #100) or is so-called BG#80 finish (a finish direction is the railcar front-rear direction). Then, the surface of the predetermined portion is adequately degreased by acetone to remove dirt.

(2) Cutting of Carbon Fiber Sheet

The carbon fiber sheet is cut by using cutting tools, such as a cutter knife and a ruler, into a desired shape corresponding to the predetermined portion. Especially, in the case of applying the carbon fiber sheet to a curved portion, such as the corner portion of the peripheral portion defining the window opening, the carbon fiber sheet is cut by using a cutting die, a cutting machine, or the like. With this, the work efficiency can be improved, and the accuracy and quality can also be improved.

(3) Application of Primer

The primer is applied by using a roller brush at a ratio of, for example, 200 g/m$^2$ and is left for two to four hours or longer (preferably about a day). Here, the purposes of applying the primer are to protect the surface of the side outside plate immediately after the side outside plate is grinded and to avoid the generation of the corrosion by a potential difference between the carbon fiber of the carbon fiber reinforced resin and the side outside plate directly contacting each other. To be specific, the primer also serves as the insulating layer. Moreover, the reason why the amount of primer applied is managed is because it is difficult to manage the thickness of the resin during the process. Moreover, the reason why the viscosity of the primer is lower than that of the impregnated adhesive resin is because it is necessary to smoothly spread the primer on the surface of the side outside plate.

(4) Undercoating of Impregnated Adhesive Resin

The impregnated adhesive resin is applied by the roller brush as an undercoating. For example, used for one layer of the impregnated adhesive resin is 500 g/m$^2$. Here, the impregnated adhesive resin is prepared such that a main agent and a hardening agent are measured and mixed at a predetermined mixing ratio (Main Agent:Hardening Agent=2:1), and then uniformly kneaded by a spatula.

(5) Attaching of Carbon Fiber Sheet

Before the undercoating is solidified, the carbon fiber sheet is attached thereto. At this time, since the viscosity of the impregnated adhesive resin is high, the carbon fiber sheet is not displaced. Then, the carbon fiber sheet is rubbed with a degassing roller and is impregnated with the impregnated adhesive resin. Then, the carbon fiber sheet is left for about 30 minutes. Thus, the impregnation proceeds by capillarity (the impregnated resin comes to the surface from between the fibers).

(6) Overcoating of Impregnated Adhesive Resin

Further, the impregnated adhesive resin is applied thereto by the roller brush as an overcoating. For example, used for one layer of the impregnated adhesive resin is 300 g/m$^2$, which is smaller than that of the undercoating. Here, used for one undercoating is 500 g/m$^2$, and used for one overcoating is 300 g/m$^2$. The reason why the undercoating is larger in amount than the overcoating is because the sheet is efficiently impregnated with the resin by the capillarity so as to be held during the impregnation.

(7) Second and Subsequent Layers

According to need, the process returns to the step (4), and the carbon fiber sheet is attached as the second or subsequent layer. Here, to ease stress concentration at an adhesive end, the second and subsequent layers are attached such that sheet end portions thereof are displaced about 5 to 10 mm. In this case, the amount of resin used between the sheets is determined in consideration of workability and ease of impregnation. However, the amount of resin used between the sheets can be changed in accordance with the amount of fiber per unit volume such that the fiber and the resin are contained at a substantially equal rate.

Reference Signs List 1, 21, 21', 51 side bodyshell
2, 52 side outside plate
2b window opening
2e door pocket portion
2f to 2h peripheral portion
3, 53 horizontal frame member
4 vertical frame member
5A to 5F carbon fiber reinforced resin member
6 primer
7 carbon fiber sheet
8 impregnated adhesive resin
52a curved portion

The invention claimed is:

1. A railcar bodyshell comprising:
a metal side outside plate having an opening;
a plurality of metal horizontal frame members joined to an inner surface of the side outside plate and extending in a railcar front-rear direction;
a plurality of metal vertical frame members joined to the horizontal frame members and extending in a railcar upper-lower direction; and
a fiber reinforced resin member joined to a predetermined portion on an inner surface side of the side outside plate, the predetermined portion including a corner portion of a peripheral portion defining the opening or including a part of a portion between the frame members;
wherein the vertical frame member is located at a car interior side of the fiber reinforced resin member so as to overlap a part of the fiber reinforced resin member when viewed from a normal direction of a car interior side of the side outside plate.

2. The railcar bodyshell according to claim 1, wherein the fiber reinforced resin member is formed such that a fiber sheet is adhered to the predetermined portion by an impregnated adhesive resin.

3. The railcar bodyshell according to claim 1, further comprising a metal window frame joined to an outer surface of the side outside plate at the peripheral portion defining the opening that is a window opening, wherein
the fiber reinforced resin member is joined to a position overlapping with a portion where the window frame and the side outside plate are joined to each other when viewed from a normal direction of the side outside plate.

4. The railcar bodyshell according to claim 1, wherein:
the opening has a substantially rectangular shape;
the fiber reinforced resin member is joined to each of the corner portions of the peripheral portion defining the opening; and
a fiber direction of the fiber reinforced resin member is set at an angle at which an imaginary extended line in the fiber direction does not intersect with the opening.

5. The railcar bodyshell according to claim 1, wherein:
the opening has a substantially rectangular shape;
the fiber reinforced resin member is joined to the peripheral portion defining the opening, and other fiber reinforced resin members are respectively stacked on the corner portions of the peripheral portion to overlap the fiber reinforced resin member such that fiber directions thereof are different from that of the above fiber reinforced resin member; and
the fiber directions of the stacked fiber reinforced resin members are set such that imaginary extended lines in the fiber directions do not intersect with the opening.

6. The railcar bodyshell according to claim 1, wherein the horizontal frame members are laser welded to the side outside plate.

7. The railcar bodyshell according to claim 1, wherein the fiber reinforced resin member is arranged to cover a weld mark of the inner side surface of the side outside plate.

8. A method for manufacturing a railcar bodyshell, comprising the steps of:
joining a plurality of metal horizontal frame members to an inner surface of a metal side outside plate having an opening, the horizontal frame members extending in a railcar front-rear direction;
joining a plurality of metal vertical frame members to an inner surface of a metal side outside plate having an opening, the vertical frame members extending in a railcar upper-lower direction; and
forming a fiber reinforced resin member by adhering a fiber sheet to a predetermined portion on an inner surface side of the side outside plate by an impregnated adhesive resin, the predetermined portion including a corner portion of a peripheral portion defining the opening or including a part of a portion between the frame members;
wherein the vertical frame member is located at a car interior side of the fiber reinforced resin member so as to overlap a part of the fiber reinforced resin member when viewed from a normal direction of a car interior side of the side outside plate.

9. The method according to claim 8, wherein the step of forming the fiber reinforced resin member includes:
applying a primer to the inner surface of the side outside plate;
after the primer is solidified, applying an impregnated adhesive resin as an undercoating;
before the impregnated adhesive resin as the undercoating is solidified, placing the fiber sheet;
further applying the impregnated adhesive resin as an overcoating; and
infiltrating the impregnated adhesive resin into the fiber sheet.

* * * * *